United States Patent
Fan

(10) Patent No.: US 7,647,398 B1
(45) Date of Patent: Jan. 12, 2010

(54) EVENT QUERY IN THE CONTEXT OF DELEGATED ADMINISTRATION

(75) Inventor: Yi Pin Fan, Cupertino, CA (US)

(73) Assignee: Trend Micro, Inc. (JP)

( * ) Notice: Subject to any disclaimer, the term of this patent is extended or adjusted under 35 U.S.C. 154(b) by 628 days.

(21) Appl. No.: 11/183,665

(22) Filed: Jul. 18, 2005

(51) Int. Cl.
*G06F 15/173* (2006.01)
*G06F 15/16* (2006.01)
*G06F 7/00* (2006.01)

(52) U.S. Cl. ............... 709/224; 709/206; 707/3; 726/3

(58) Field of Classification Search ............ None
See application file for complete search history.

(56) References Cited

U.S. PATENT DOCUMENTS

| | | | |
|---|---|---|---|
| 5,355,371 A * | 10/1994 | Auerbach et al. | 370/255 |
| 5,983,270 A * | 11/1999 | Abraham et al. | 709/224 |
| 6,480,885 B1 * | 11/2002 | Olivier | 709/207 |
| 7,024,458 B2 * | 4/2006 | Chan et al. | 709/206 |
| 7,089,243 B1 * | 8/2006 | Zhang | 707/9 |
| 2006/0010213 A1 * | 1/2006 | Mehta | 709/206 |
| 2006/0010322 A1 * | 1/2006 | Novack et al. | 713/170 |
| 2006/0036619 A1 * | 2/2006 | Fuerst et al. | 707/100 |
| 2006/0143161 A1 * | 6/2006 | Munro | 707/3 |
| 2006/0178898 A1 * | 8/2006 | Habibi | 705/1 |

* cited by examiner

*Primary Examiner*—Wen-Tai Lin
(74) *Attorney, Agent, or Firm*—Beyer Law Group LLP

(57) ABSTRACT

When an event (for example, an e-mail message) is received at a server it is saved into a log file (or a summary is saved). The log entry for each message includes a set of groups within an organization to which the message is considered to belong. An administrator who has authority over any one of those groups is allowed to view this message. When an administrator logs onto the system it is determined which group or groups the administrator owns, i.e., for which groups the administrator has the authority to view their e-mail messages. For each e-mail log entry it is determined whether there is a group in common between the set of groups stored in the log entry and the groups that the administrator owns. A group in common indicates that the administrator is allowed to view that particular e-mail message.

8 Claims, 9 Drawing Sheets

Event Log File Schema

| Group | Parent Group |
|---|---|
| T1 | T, R |
| T2 | T, R |
| T3 | T, R |
| U1 | U, R |
| U2 | U, R |
| U3 | U, R |
| J1 | J, R |
| J2 | J, R |
| J3 | J, R |

Parent Group Look-up Table

*FIG. 9*

EVENT QUERY IN THE CONTEXT OF DELEGATED ADMINISTRATION

FIELD OF THE INVENTION

The present invention relates generally to a searching technique in a data structure. More specifically, the present invention relates to an event query in a hierarchical data structure in the context of delegated administration.

BACKGROUND OF THE INVENTION

Delegated administration is the process of distributing various administrative tasks to one or more administrators. As computer systems and networks become larger and more complex, and as companies become larger and offer more services over the Internet, a central administration model is no longer viable. Delegated administration addresses this issue by delegating or distributing any of a number of administration tasks to any number of administrators. Delegated administration allows one to confine to each administrator the tools, tasks and data that are restricted to specific domains within a hierarchy—as opposed to a non-delegated environment that exposes each administrator to a potentially overwhelming number of tools, tasks and amount of data without restriction.

Delegated administration is useful because it enables a company to organize its administration framework according to its business environment, because one can control and allocate administrative tasks, and because it helps to manage large-scale implementations. Nevertheless, certain aspects of delegated administration can be improved upon.

FIG. 1 illustrates a prior art representation of users within a company organized in a tree structure 10. In this simple example, users are organized by department (or groups) and all users are managed as a single domain. A single administrator is responsible for managing the entire company with the effect that it might take a long time to process certain requests related to a user, and the administrator processing the request might not understand the particular business requirements of one of the departments. Shown is a user 12 associated with an event 14. Event 14 may be any of a wide variety of events, data or attributes associated with a particular user. In this simple example, event 14 is an e-mail message that user 12 has received.

FIG. 2 illustrates a prior art representation of the same users organized in a tree structure 50 that is divided into domains 60 and 70. In this example, the concept of delegated administration is used to manage the users. Administration of users in domain 60 is delegated to one administrator, while administration of users in domain 70 is delegated to another administrator. This delegated administration helps to better apply the business requirements of a particular group or department when performing user administration. Of course, delegated administration in real life is often much more complex, involving huge tree structures, many departments or groups, many types of events, and large numbers of domains and administrators. Certain queries that an administrator might need to perform within the tree structure can be time consuming.

For example, in a delegated administration environment one of the administrators should only be allowed to view e-mail messages corresponding to users within that administrators own domain (i.e., any number of departments or groups). It can be very time consuming for the system to determine whether an administrator can view message 14 corresponding to user 12. For an administrator who logs in to the system corresponding to tree structure 50, the system must first determine to which group user 12 belongs and then match that group to any of the groups that are managed by the administrator. This procedure must be performed on each e-mail message.

A typical e-mail message log contains a record of the recipient of the message (for example, user 12). When one of the administrators (having been delegated responsibility for any number of groups within structure 50) logs into the system and requests to view all relevant e-mail messages, a backend program of the system must sort through the users, groups and e-mail messages to determine which messages the administrator may view. The typical computing time for one e-mail log entry includes determining to which group the user belongs based upon the e-mail log (time 1), plus matching this group with any of the groups that are part of the administrator's domain (time 2). The first time segment (time 1) depends upon the total number of e-mail addresses within the organization, and the second time segment (time 2) depends on how many groups for which the administrator is responsible. If the total number of e-mail log entries within the organization is N, then the total computing time for this request by the administrator is N*(time 1+time 2).

Other prior art techniques for implementing delegated administration and for performing such requests leverage LDAP. The Lightweight Directory Access Protocol is a set of protocols for accessing information directories and is a simpler version of the X.500 standard. LDAP is a sibling protocol to HTTP and to FTP and its functionality is very powerful, but it can be time consuming to obtain a query result, especially for large amounts of data queries.

Accordingly, a system and technique are needed to allow event queries on hierarchical groups to be performed efficiently in the context of delegated administration.

SUMMARY OF THE INVENTION

To achieve the foregoing, and in accordance with the purpose of the present invention, a technique is disclosed that allows an administrator to view its own domain's events more efficiently and less expensively in the context of delegated administration. In particular, the present technique is much faster than performing a traditional LDAP query.

When an event (in this example, an e-mail message) is received at a scanning server it is saved into a log file (or a summary of the message is saved). In a large corporation, tens of thousands of messages might be logged daily. An administrator to whom has been delegated authority to view only a portion of these e-mail messages for certain groups within an organization or for certain users needs an efficient mechanism to bring up those relevant e-mail messages quickly for viewing. The log entry for each message includes a set of groups to which the message is considered to belong. When an administrator logs onto the system it is determined which group or groups the administrator owns, i.e., for which groups the administrator has the authority to view their e-mail messages. For each e-mail log entry it is determined whether there is a group in common between the set of groups stored in the log entry and the groups that the administrator owns. A group in common indicates that the administrator is allowed to view that particular e-mail message.

The present invention allows a much faster response when an administrator logs on in order to view those e-mail messages within his or her domain. For example, the system is capable of managing 70,000 e-mail messages on a single machine and can filter and present 3,000 e-mail messages for an administrator to view within a few seconds.

The present invention is applicable in the administration of Web portals, in general user administration, in messaging security systems, in the management of Internet domains, and in other situations.

BRIEF DESCRIPTION OF THE DRAWINGS

The invention, together with further advantages thereof, may best be understood by reference to the following description taken in conjunction with the accompanying drawings in which:

FIG. 9 illustrates an exemplary parent group lookup table.

DETAILED DESCRIPTION OF THE INVENTION

Figure 1:
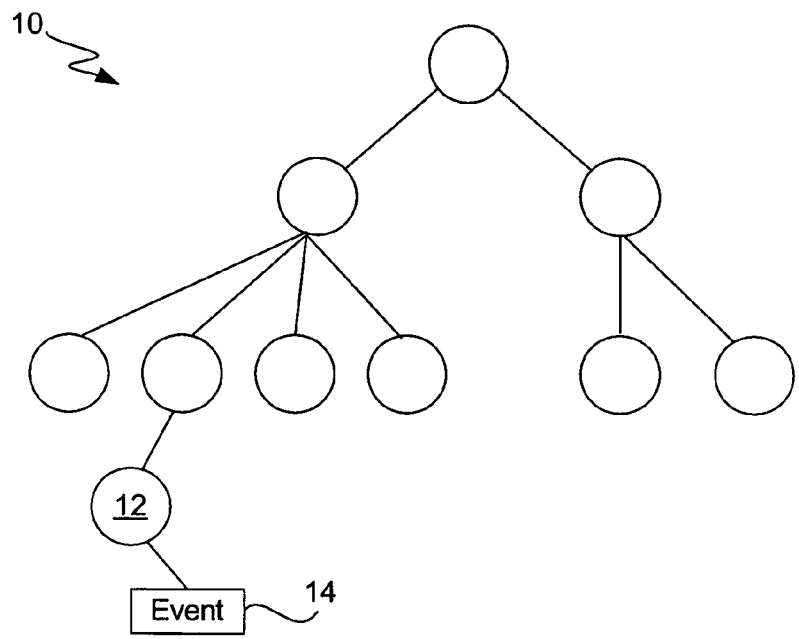
FIG. 1 illustrates a prior art representation of users within a company organized in a tree structure.
Figure 2:
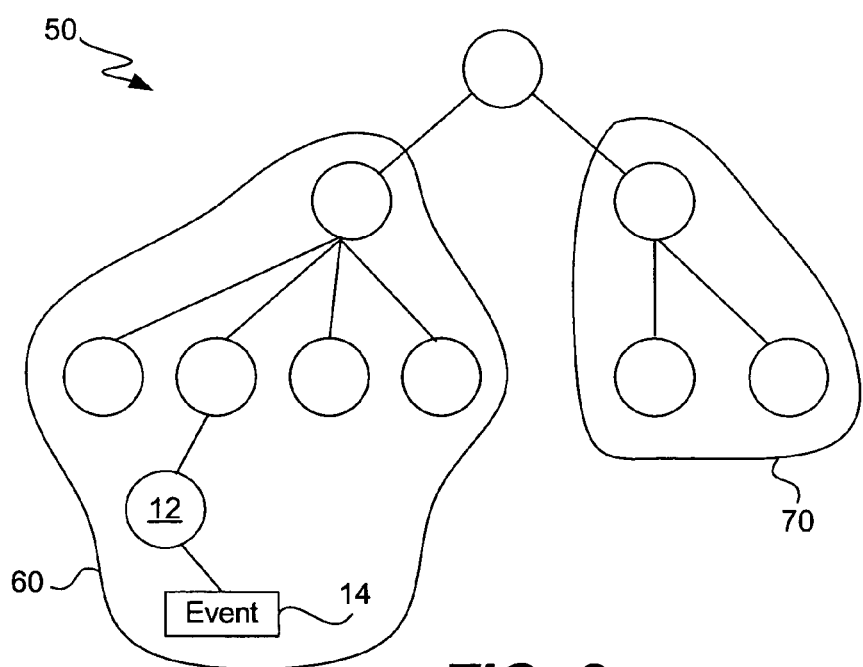
FIG. 2 illustrates a prior art representation of the same users organized in a tree structure that is divided into domains.

The present invention is useful in a variety of situations where delegated administration is used. For example, delegated administration is often used in the management of Web portals. As enterprises create larger and more complex portals, a central administration model is no longer viable; delegated administration distributes the administration tasks amongst those benefiting from use of the portal. Tasks are often distributed to line of business (LOB) administrators who perform actions such as adding or removing users. A Web portal (or gateway) is a World Wide Web site that is a starting point for users were they can connect to the Web or that users may visit as an anchor site, linking to many other sites. Typical services offered by portal sites include a directory of web sites, search engines, news, weather information, e-mail, stock quotes, telephone and map information, a community forum, shopping, etc. The term also refers to web sites that offer services to customers of particular industries, such as a web-based bank portal from which customers can access their checking, savings and investment accounts.

Due to the growing complexity of web portals, the number of different services they provide, the number of users, the types of data that may be stored, etc., the concept of delegated administration can be a valuable tool in managing these portals. The present invention is suitable for use in managing Web portals when administrators need to access and manage users and their events that are handled by the portal.

Delegated administration is also useful in large networks as a user administration tool. Within a particular company, delegated administration is a valuable user administration tool because there might be multiple divisions within the company or multiple projects that require a slightly different way of administering user accounts. Further, internal politics, regional differences, or even the number of identities and accounts might indicate that delegated administration is the best approach. Each administrator to whom control has been delegated may have the ability to create, update or deactivate users and to reset passwords for their particular group or subgroups. Or, a company might have vendors who need computer accounts set up on a particular price bidding system. The company can delegate the identity and account management to the vendor using delegated administration instead of administering all the accounts themselves. The present invention is suitable for use in user demonstration when administrators need to access and manage users and their associated events.

The present invention is also suitable for use in the management of Internet domains by and Internet Service Provider where delegated administration is used. For example, an ISP managing any number of domains for various companies might wish to delegate administration of those domains (including their users, electronic-mail, files, etc.) to different administrators. The present invention can be used in this situation to greatly speed up access time to events in a domain that an administrator wishes to view.

The present invention is also suitable for use in the context of messaging security. When large volumes of e-mail messages are scanned, quarantined or delivered, use of delegated administration can be beneficial. The present invention operates in this environment to provide faster service for the administrators to whom responsibility has been delegated.

Malware Scanning Environment

Figure 3:
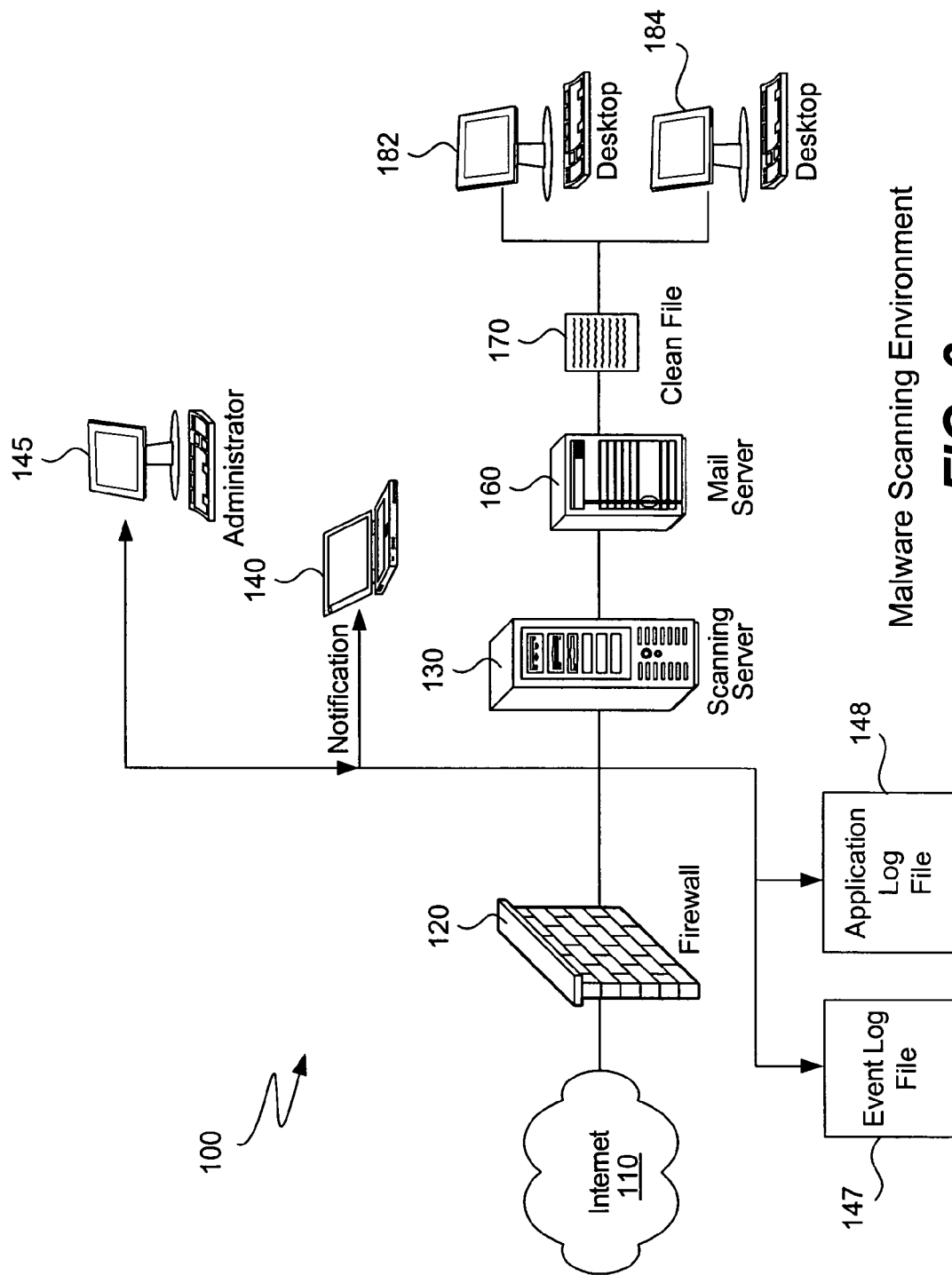
FIG. 3 is a block diagram of a malware scanning environment in which the present invention is suitable for use.

FIG. 3 is a block diagram of a malware scanning environment 100 in which the present invention is suitable for use. Malware scanning environment 100 operates to scan incoming e-mail messages within a corporate or other environment and to handle these messages accordingly. Environment 100 is arranged to protect a computer network by stopping malicious code, spam, inappropriate content, and mixed threat attacks at the messaging gateway, the first point of entry for most attacks.

Internet 110 is the well-known medium over which e-mail messages can be sent and received by many entities. Firewall 120 is a well-known device or software that protects computer networks. Scanning server 130 is any suitable type of computer arranged to scan incoming e-mail traffic; initially, all incoming messages are stored as files on the scanning server while they are being scanned. In one particular embodiment of the invention, server 130 scans SMTP and POP3 message traffic for malware (such as viruses, worms, etc.), spam and inappropriate content. The server is arranged to delete, quarantine or clean and deliver any offending e-mail messages. Messages that are clean after scanning are forwarded to mail server 160 for delivery and then deleted from the scanning server. Messages that include malware (such as a computer virus) but that can be cleaned are first cleaned, then delivered and deleted. If scanning indicates that a particular message includes malicious code, spam or inappropriate content, and it is not readily apparent how to deal with such message (or cannot be cleaned), then the message is sent to a quarantine folder on the scanning server for later review.

Computer 140 is any suitable laptop or desktop computer connected to environment 100 and in communication with server 130 that serves to receive notifications from server 130 and to control operation of the server. Computer 140 is preferably used by an administrator or operator to receive notification messages for any abnormal events. A notification message can also be delivered via mail server 160.

Computer 145 is also in communication with scanning server 130 and provides a user interface by which an administrator may log on and manage their users and events (such as e-mail traffic). Computer 145 may also connect to server 130 over a Web interface thus allowing an administrator to connect to server 130 over the Internet and perform administration from a remote location. The user interface by which an administrator accesses and manages data on the server 130 may be any suitable user interface such as off-the-shelf software or proprietary software. In one particular embodiment, the user interface used is a query language based upon SQL.

Event log file 147 is a log file containing summary entries for all e-mail messages that are received by server 130. Log file 147 includes enough information for an administrator to search, review, trace and manage the information contained therein. Application log file 148 is a log file that contains detailed information on the scanning results for the application. Application log file 148 includes when the program starts up or terminates, error messages that occur during scanning, and events that happen while the service is running such as incoming messages, configuration changes, loading of libraries, which configuration is loaded, which threads are created, etc. The application log will typically not be stored in a database and is often treated as a debugging log.

Preferably, both log files are initially created and stored on server 130. Log file 147 is also copied to a remote database external to the scanning server. Locating the log file on a remote database can make it easier for an administrator to take actions and perform queries. The present invention may then be used by an administrator to search, review, access and manage e-mail messages stored in this log file that is the responsibility of that administrator.

Mail server 160 is any suitable mail server arranged to receive incoming electronic mail from server 130 and to deliver electronic mail (for example, file 170) to users represented by computers 182 and 184. As is known in the art, mail server 160 forwards messages to individual users or may store them as per standard procedure.

Administrator Event Query

Figure 4:
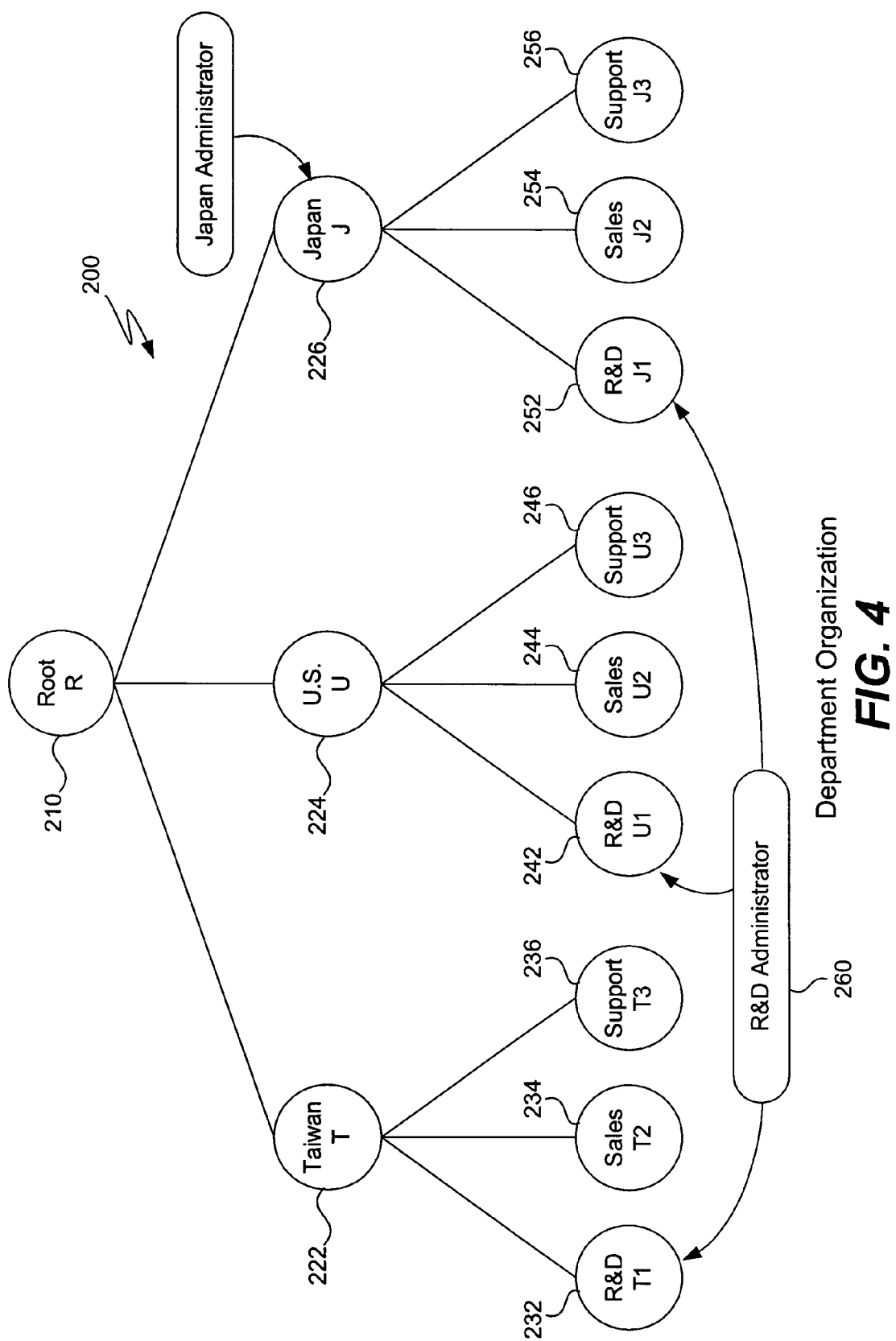
FIG. 4 illustrates a department organization for an example company.

FIG. 4 illustrates a department organization 200 for an example company. The company has been organized by department into a tree hierarchy and employees of the company are members of one of the departments or groups. With this tree hierarchy, the technique of delegated administration can be used to manage events pertaining to employees of the company and the present invention is suitable for use. Of course, other hierarchies and organizational schemes other than a tree structure may be used as long as the employees can be organized into various departments or groups that can be assigned to a certain administrator. In this example, root 210 (e.g., top-level management or a top administrator) is responsible for groups 222, 224 and 226 (the departments of Taiwan, United States and Japan). In turn, the Taiwan group is divided into the groups of R&D 232, sales 234 and support 236. The United States group and the Japan group are subdivided in a similar fashion. Each department or group within the hierarchy is assigned a unique group identifier as shown below the group name, e.g., R for root, U for the United States, and J2 for sales 254 in the country of Japan.

Each employee of the company will be a member of a particular department or group, or may even belong to more than one group. For example, an employee of the United States in the R&D department 242 would be a member of group U1. A particular event associated with an employee of the company may then be associated with one or more of the unique group identifiers. In this particular example, an event is an e-mail message that has been received by an employee and that has been processed or stored for later review or analysis. In this situation, one of the administrators to whom authority has been delegated desires to view those e-mail messages belonging to employees that are members of one of the groups managed by that administrator. Of course, the present invention is applicable to events other than e-mail messages. For example, an event may also be: a Web access event in which a company proxy logs which computer goes to which web site at what time; a document update event in which a document server logs which document has been updated by which user, especially if the document is confidential; and a time-off event in which an employee requests time off and only his or her manager can see the request for time off.

An administrator may be delegated authority for a group or groups within a company according to any suitable scheme. In this simple example we describe six different administrators to whom administration has been delegated. The Taiwan administrator manages the groups T, T1, T2 and T3. The U.S. administrator manages the groups U, U1, U2 and U3; and the Japan administrator manages the groups J, J1, J2 and J3. It is assumed that an administrator responsible for a particular parent group will own the below groups as well. In other words, the Taiwan administrator by virtue of managing group T is automatically owner of groups T1, T2 and T3. An R&D administrator 260 (as shown) manages the groups T1, U1 and J1. In a similar fashion, a sales administrator manages the groups T2, U2 and J2; and a support administrator manages the groups T3, U3 and J3.

An e-mail message received by an employee working in the Japan R&D group 252 (J1) should be able to be viewed by not only R&D administrator 260 but also by the Japan administrator for group J. It has been realized that if additional group information is added to a message log entry then a query by an administrator can be greatly speeded up. For example, consider an e-mail message sent to an employee of the R&D department in Japan having an e-mail address of user1@rd.jp. By database query it can be determined that the group to which the employee belongs is group J1; this recipient group identifier is then added to the log entry for this e-mail message. The parent groups for this R&D group are then determined, the parent groups being groups J and R; these parent group identifiers are also added to the log entry. Collectively, these three groups, J1, J and R, are known as the message groups set and help to identify which groups within the organization effectively own this e-mail message received by the user named "user1."

If the Japan administrator now logs onto the system and wishes to view the e-mail messages that he or she is allowed to view, it can be determined simply quickly whether or not the Japan administrator can view this message sent to the user named "user1." First, it is determined which groups are within the domain of the Japan administrator. In this example, the Japan administrator owns group J. By virtue of owning group J, the Japan administrator is assumed to also own the groups below, namely groups J1, J2 and J3. (In an alternative embodiment, the groups within the Japan administrator's domain are explicitly listed, i.e., J, J1, J2 and J3.) Thus, the domain of the Japan administrator consists of group J, this domain is termed the administrator groups set.

A simple comparison is then performed: if there is a group in common between the message groups set (J1, J and R) and the administrator groups set (I) then the administrator will be allowed to view this particular e-mail message. In this example, there is a group in common and the Japan administrator can view this message.

In another example, assume that the R&D administrator logs onto the system and wishes to view e-mail messages to which he or she is allowed access. Again, the message groups set for the message received by "user1" is J1, J and R as previously determined. The administrator groups set for R&D administrator 260 is T1, U1 and J1 as has been previously defined under delegated administration. There is a group in common between the two sets, thus the R&D administrator is allowed to view the message received by "user1."

The present invention can thus process N log entries in a total time of N*time 3, where time 3 is the time it takes to perform the comparison between the message groups set and the administrator groups set. Compared to the prior art technique which can take a time equivalent to N*(time 1+time 2), where time 1 depends upon the total number of e-mail addresses within the organization and time 2 depends on how many groups for which the administrator is responsible, the present invention will be much faster. In the embodiment where the parent groups are combined with the recipient group to form the message groups set, it is realized that the size of this set depends upon the depth of the organization. Therefore, it is expected that this set size will most likely be relatively small. Further, in the real world the size of the administrator groups set is also expected to be relatively small, meaning that time 3 (to perform a comparison between the message groups set and the administrator groups set) will be much smaller than time 1+time 2.

Because extra time is required to obtain the parent group list for a given recipient group, this calculation can be performed when the e-mail message is first logged, rather than performing the calculation when the administrator submits a query. The structure of an organization, however, will not change very often and thus a mapping from a particular group to a set of known parent groups can be determined ahead of time and saved in a table, for example. Thus, no significant extra time is required during a query to calculate a particular parent group list for a particular recipient group (aside from accessing a lookup table) and the time to determine the parent group list will be constant. FIG. 9 illustrates an exemplary parent group lookup table 600. This table has a column 610 listing all of the relevant recipient groups for which an e-mail message might be the subject of a query (based upon the example of FIG. 4) and a column 620 listing the parent groups for each particular group in the first column. Given a particular recipient group, it is relatively simple and quick to look up the corresponding parent groups list. Because the space required to store the parent groups list depends upon the depth of the organization it is likely not to occupy an unreasonable amount of space.

In an alternative embodiment, a determination of the parent groups for a particular recipient group can be dispensed with. In this alternative embodiment it is not assumed that an administrator at a high level automatically has a domain that includes any lower-level groups. For example, if the Japan administrator does indeed have authority over groups J1, J2 and J3, then all of these groups will be explicitly listed in the domain belonging to that administrator. Thus, the administrator groups set for the Japan administrator would be explicitly listed as: J, J1, J2 and J3. In this alternative embodiment, is not necessary to determine the parent groups of a particular user nor record any parent group information in the log entry. Of course, if the Japan administrator only has authority over group J, then the domain for that administrator would simply be J. In this embodiment, the message groups set includes only the group to which the recipient belongs, and it is then a simple matter to determine if the recipient group matches with one of the groups in the administrator groups set.

In another variation, it is possible to omit the group R from the message groups set since it can be assumed that the top-level administrator may view all messages.

Flow Diagrams

In one specific embodiment, the present invention is implemented within the software product IMSS version 6.0 (InterScan Messaging Security Suite) available from Trend Micro Inc. of Cupertino, Calif. The following details are presented to illustrate operation of the invention in this environment but are not intended to limit its applicability.

In this embodiment different administrators are allowed to log on to the system to manage e-mail messages corresponding to groups that are owned by that particular administrator. An administrator may manage a single group or multiple groups of users, and an administrator may manage not only groups directly below their group in a tree hierarchy, but also groups across departments. Each administrator is allowed to set different e-mail scanning policies to manage its groups messages. For example, these policies are used to scan incoming messages for malware such as viruses and worms, for spam, and for inappropriate content. When a particular message triggers a policy set by the administrator that particular message and additional information is logged as an event entry into an e-mail message log.

Figure 5:
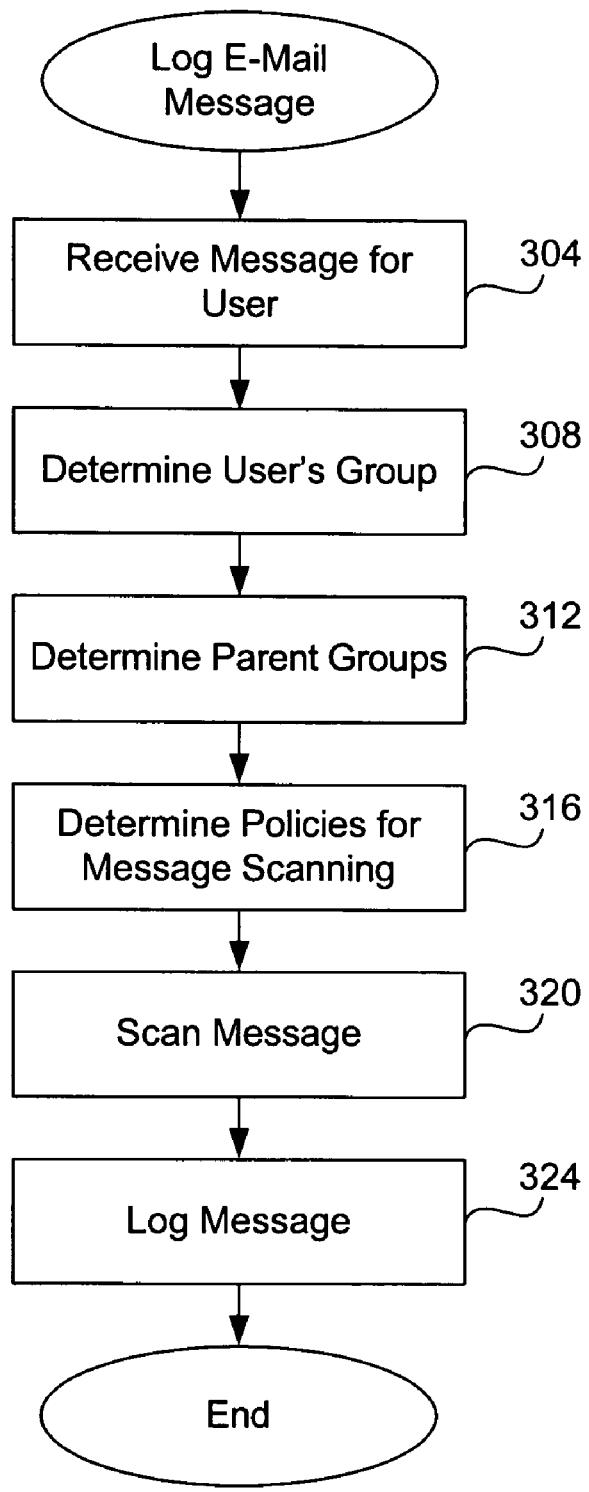
FIG. 5 is a flow diagram describing how an e-mail message is received, scanned and logged.

FIG. 5 is a flow diagram describing how an e-mail message is received, scanned and logged. Reference will be made to FIG. 3, although one of skill in the art will appreciate that the invention may be implemented in many other suitable computing environments. In step 304 an incoming e-mail message is received for a particular user at scanning server 130. The e-mail message is stored as a file on the scanning server using its internal message identifier as a file name. Next, in step 308 the group to which the user belongs in the company is determined along with the group identifier. In one particular embodiment, the user's e-mail name (not including the domain address after the "@") is submitted as part of an LDAP query to perform a table lookup to retrieve the group identifier for the user.

For example, if the user is a member of the R&D group of Japan as shown in FIG. 4 then the group identifier J1 would be returned. In another embodiment the user's group and corresponding group identifier is determined by reference to the users e-mail address. Or, a simple table lookup may be performed on the scanning server using the user's e-mail name or name as a key.

In step 312 the parent groups and their corresponding identifiers are determined relative to the user's group. In one particular embodiment, the current group identifier is submitted as part of an LDAP query to perform a table lookup to retrieve the group identifiers for the parent groups.

As an example, consider a user who is a member of a subgroup of the R&D group of the U.S. as shown in FIG. 4. As described above in step 308, the user's group is obtained and its unique identifier is U1:1. Next, an LDAP query is submitted asking what is the parent group of group U1:1; the result is group U1. This step is repeated (asking what is the parent group of the group most recently returned) until the LDAP query results in a response of "group does not exist." The returned groups from the submitted queries thus form a list of the parent groups. Preferably, a cache mechanism is implemented to keep track of the associated parent groups for particular recipient e-mail addresses.

In another example, if the user's group is J1, then the parent groups are Japan and Root and list of parent group identifiers J, R would be returned. Now that the user group identifier and the parent group identifiers have been determined, they can be combined to form a list termed the message groups set. In this simple example, the message groups set would be J1, J, and R. The message groups set identifies groups to which the message belongs. If the administrator owns any one of those groups then the administrator will be allowed to access and process the e-mail message.

In step 316 the current policies pertaining to the group to which the user belongs are determined. In one embodiment, policies are associated with groups as follows. When a rule (or policy) is created by an administrator that rule will have a property that associates the rule with the group managed by that administrator. For example, in FIG. 4 it is shown that the R&D administrator manages groups T1, U1 and J1; a rule created by the R&D administrator would thus have a property that indicates the groups T1, U1 and J1. Also, the rule property will also contain all children groups relative to groups T1, U1 and J1 if they exist. Thus, when an incoming message arrives it uses the known recipient user group to match all relevant rules and thus the rules that should apply to this incoming message are determined.

In one particular embodiment, policies may be set by an administrator for all of the groups that he or she manages (i.e., a domain), for individual groups or even for individuals. Policies may be set for detecting malware such as viruses, worms etc., and to take certain actions when that malware is detected. Anti-spam policies may also be set including spam tolerance settings, approved and blocked sender lists, filter actions, etc. Content filtering policies filter out non-business or inappropriate e-mail based on keywords, true file types, attachment names, attachment sizes, and other content security rules.

Once the relevant policies are determined then the message is scanned with those policies in place in step 320. In this particular embodiment, scanning makes use of antivirus technology, a spam filtering module and advanced content filtering technology all available from Trend Micro of Cupertino, Calif. If the message is found not to have any problems then the message is delivered to the mail server 160 and is deleted from the scanning server. If the message contains a virus but the virus can be removed, then the message is cleaned, delivered to the mail server and also deleted. If the message contains a virus that cannot be removed, or it is questionable whether the message is actually spam or contains inappropriate content than the message file is moved to a special quarantine folder on the scanning server.

In step 324 a summary of the e-mail message is saved into an e-mail event log file. This logging may take place when the message is received, before scanning occurs, during the scanning process or after the scanning process. Preferably, logging occurs after steps 308 and 312 so that the group information can also be recorded in the log entry. All incoming e-mail messages are logged into an Event Log File 147; each log entry will contain an indication of whether this particular e-mail message has triggered a particular policy. Certain events are also logged into Application Log File 148 for debugging purposes. In a variation on this embodiment, Event Log File 147 records three different policy event types such as a virus message event, a content security message event and a spam event. There is an indicator (field) in each entry in the event log file to specify to what kind of event it belongs.

Figure 6:
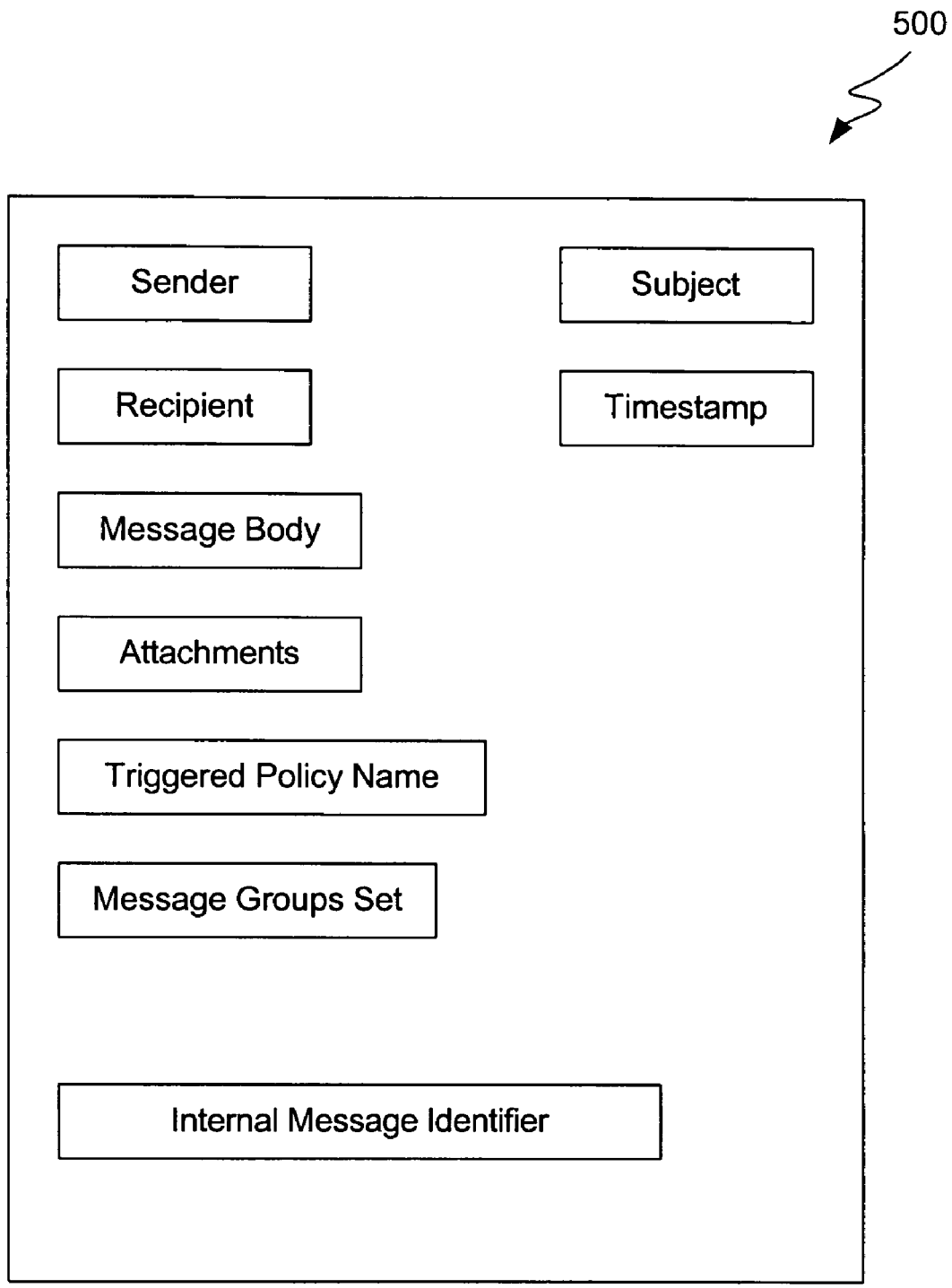
FIG. 6 illustrates one example of an e-mail log entry.

FIG. 6 illustrates one example of an e-mail log entry 500 that would appear in Event Log File 147. The following information is logged into an entry in the log file: sender, recipient, message subject, size (raw message size), a unique host name and a timestamp. The sender and recipient information are taken from the SMTP envelope. The subject information is the subject string retrieved from the message body and is encoded in UTF-8. The unique host name is a mnemonic name for each scanning machine. The message body is not logged nor are the individual attachments, although the attachment names are logged into the entry. If the message has triggered a certain policy or policies during the scan then that policy name (or reasons) is also logged into the entry. For example, the reasons may be an explanation string returned from the scanner indicating which policy was violated, e.g., the attachment violates certain security settings. Also, a filter type field is included in each entry that identifies a particular plug-in that scanned the message and determined that the message should be quarantined. In this fashion, and administrator viewing the message at a later time will be made aware of the triggered policy.

The message groups set previously determined in steps 308 and 312 is also logged into an entry to facilitate later determination of whether an administrator can view this message. Alternatively, the user's group identifier and the parent group identifiers may be logged individually into the entry. An internal message identifier also forms part of the log entry although it will not necessarily be visible to an administrator. If, upon viewing a log entry, an administrator needs to review the message body or attachments of a message listed in a log entry, the administrator can access the entire message saved on the scanning server in a file using the internal message identifier.

Figure 7:
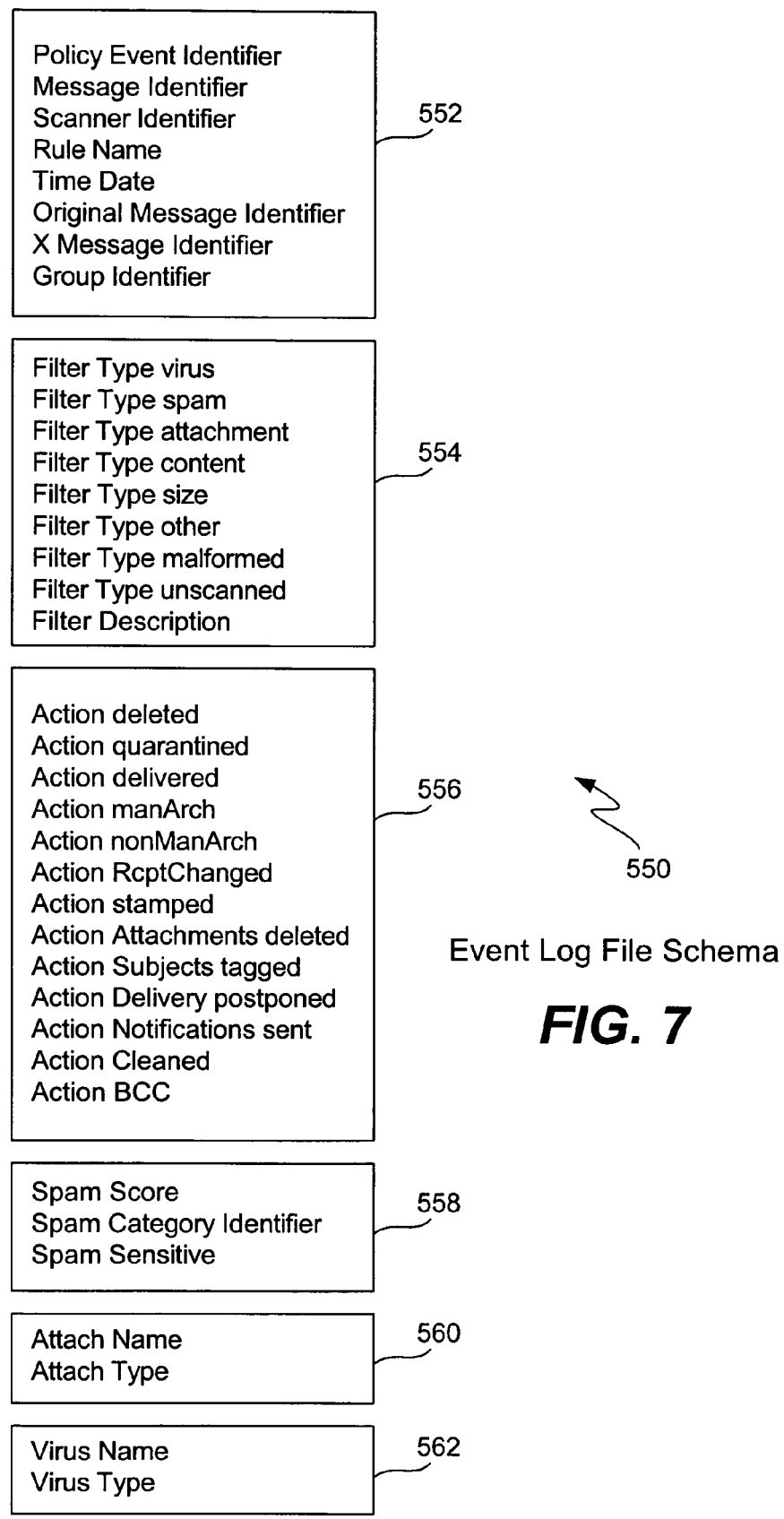
FIG. 7 illustrates one example of a schema for the event log file.

FIG. 7 illustrates one possible schema for the Event Log File. Fields 552 include identifying information for a particular message. Fields 554 include information regarding the filter type used. Fields 556 describe any of a variety of actions that might be taken. Fields 558 list information associated with a message that is identified as spam. Fields 560 describe any attachments, and Fields 562 describe any detected virus.

As shown in this schema, the fields Message Identifier and Scanner Identifier are used to identify the location of the message. In an embodiment where the scanning server and its application are distributed there might be multiple scanners on the network. In this embodiment, all of the log files generated on different scanners will be imported into one central database. Further, administrator 145 has the capability to download an entire message over a Web interface. The user interface is arranged to find the particular message using the Scanner Identifier and an IP address mapping table and to transfer the entire message from the scanner folder to administrator 145.

Figure 8:
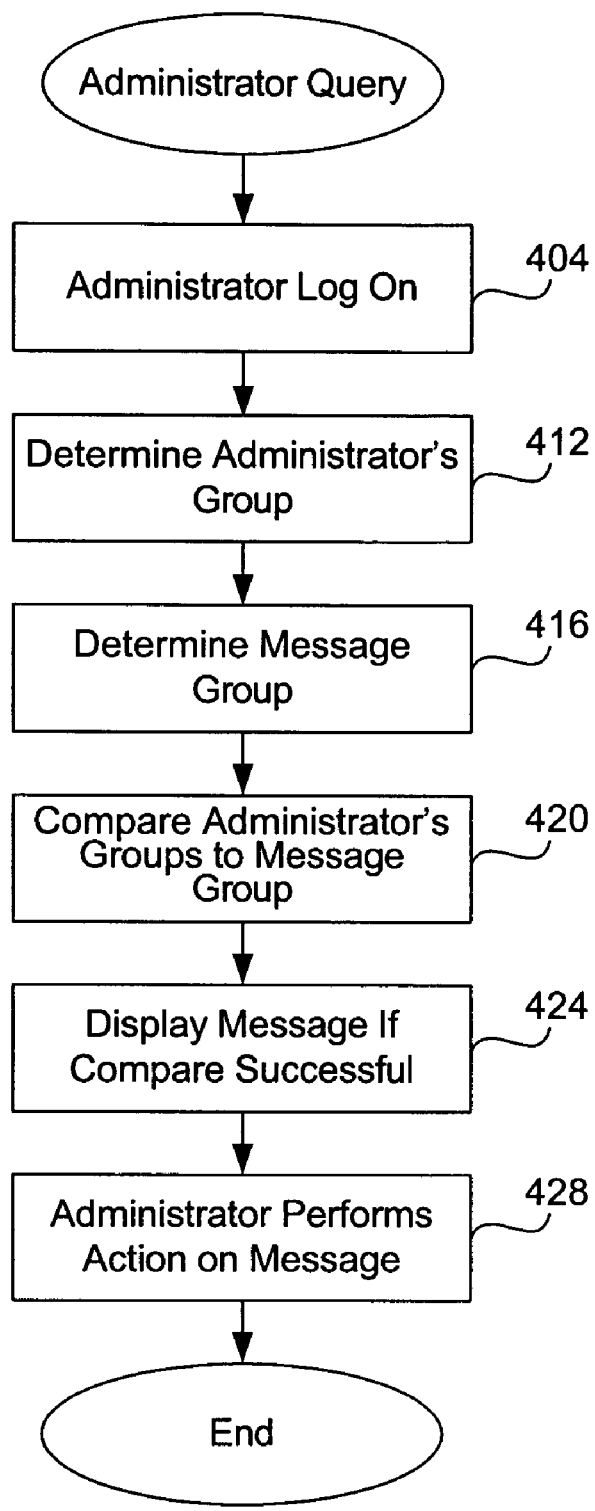
FIG. 8 is a flow diagram describing the process by which in administrator performs a query.

FIG. 8 is a flow diagram describing the process by which in administrator performs a query. Once any number of incoming e-mail messages have been received at scanning server 130 and have been logged, an administrator may log onto the system using computer 145 in order to view those messages that he or she is allowed to view. The administrator may then take an appropriate action. In step 404 the administrator logs on using his or her user name. In step 412 the system determines the groups within the organization that the administrator owns. For example, referring to FIG. 4, the Japan administrator owns group J and the R&D administrator owns groups T1, U1 and J1. Because a system of delegated administration has previously been set up within the organization the system is already were of which groups are owned by which administrator. A simple lookup is performed based upon the administrator's user name to determine which groups and their corresponding identifiers that the administrator owns. In the alternative embodiment where it is not assumed that lower-level groups are automatically owned by an administrator the groups that the administrator owns are listed explicitly. For example, referring to FIG. 4, the groups owned by the Japan administrator would be explicitly listed as J, J1, J2 and J3.

Once the groups owned by the administrator have been determined then the next step is to determine which are the groups to which a logged e-mail message belongs. In one particular embodiment, the system looks at each logged e-mail entry in the Event Log File to determine whether or not that particular e-mail message may be viewed by the administrator.

In step 416, for each e-mail log entry, the message groups for that message are retrieved by reference to the previously stored message groups set. Once the message groups set has been retrieved it is compared to the administrator groups set in step 420. Any of a variety of algorithms may be used to determine if there is a group identifier in common between the two sets. If there is a group identifier in common, this means that the administrator is allowed to view that message and in step 424 the message (or its abbreviated version, such as the recipient) is displayed to the administrator. The system continues to process each log entry in turn and will display for the administrator those e-mail messages for which the message groups set for that entry matches the administrator groups set.

Once the relevant e-mail messages have been displayed to the administrator, in step 428 the administrator may choose to perform a particular action on a message. For example, the administrator may perform a query, may direct that an e-mail message is reprocessed, may delete a message or may choose to download a message.

A query allows an administrator to search the e-mail messages even across machines with given criteria. For example, the criteria can be a keyword search on the sender, recipient, subject, triggered policy or violated rule, time range, specific machine, etc. In order to reprocess a particular e-mail message, the message is scanned again by the same scanner on the original scanning server. Scanning the message again could result in the message being flagged again as violating a particular policy and the message would again not be delivered to the end user. When a message is downloaded, the e-mail contents including the MIME structure and header will be downloaded as a whole. A message may be downloaded using administrator console 145. The administrator sees a user interface that behaves as if one is downloading a file from the Internet and the administrator can choose a file store directory.

Transitive delegation is also allowed among the various administrators. For instance, administrator A may authorize administrator B to handle management of administrator's A domain, and administrator B may authorize administrator C to handle management of both domains A and B. Administrator C may then perform delegated management of all domains A, B and C.

Computer System Embodiment

Figure 10A:
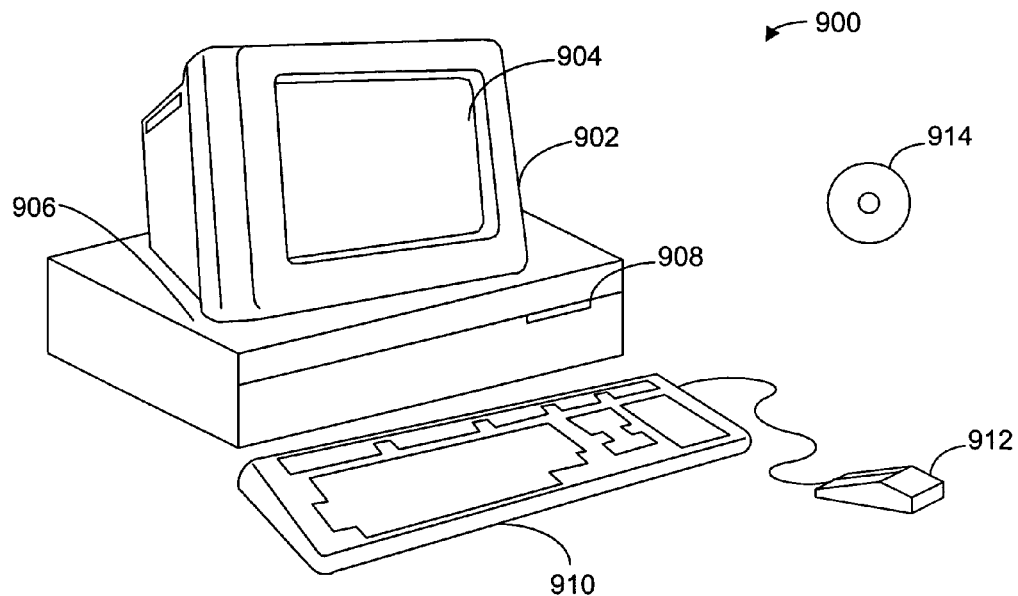
FIGS. 10A and 10B illustrate a computer system suitable for implementing embodiments of the present invention.
Figure 10B:
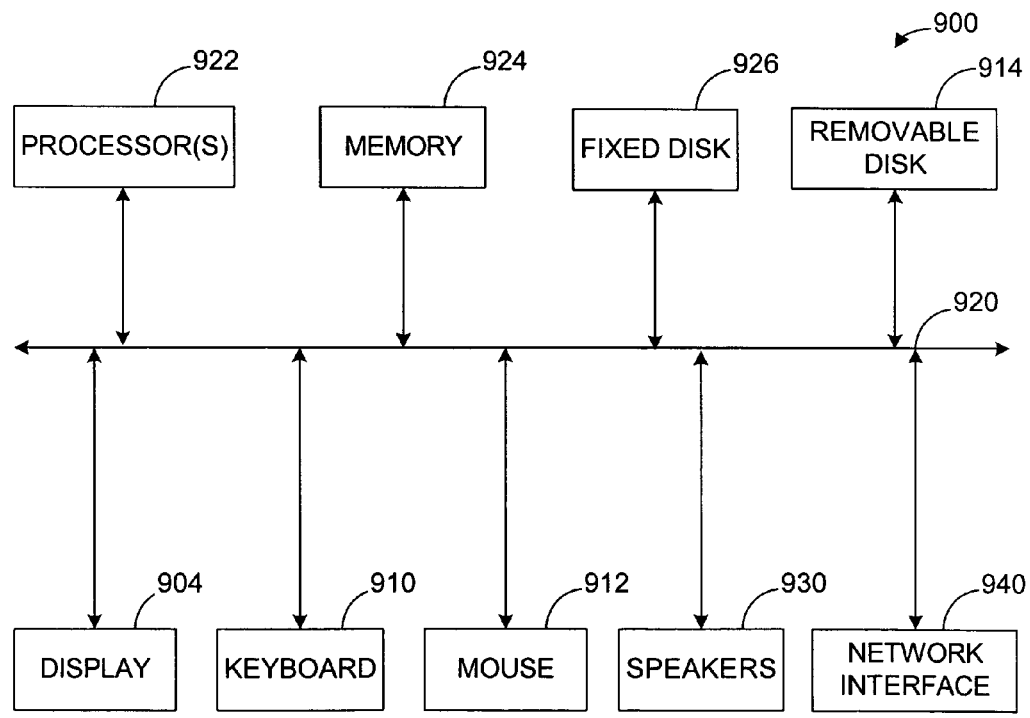

FIGS. 10A and 10B illustrate a computer system 900 suitable for implementing embodiments of the present invention. FIG. 10A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of logging an e-mail event in an organization to facilitate later access by an administrator for e-mail messaging security associated with a malware scanning system, said method comprising:

assigning to each of a plurality of users in said organization a group affiliation, each group being associated with a group identifier, such that each user has a group identifier;

assigning said administrator in said organization a plurality of groups for which said administrator manages e-mail events, wherein said administrator has an administrator identifier, said administrator identifier being associated with a plurality of group identifiers of the groups said administrator manages;

receiving said e-mail event in a computer system of said organization, said e-mail event being associated with one of said users;

determining at least one current malware policy associated with said group identifiers;

scanning an e-mail associated with said e-mail event for malware using said at least one current malware policy;

storing said e-mail event on a server computer of said computer system;

determining a user group identifier corresponding to the group to which said user belongs;

determining a plurality of parent group identifiers corresponding to groups within said organization that subsume said group to which said user belongs;

forming a message group set that includes said user group identifier and said parent group identifiers;

storing at least a portion of said e-mail event in an entry in an event log and including said message group set in said entry and at least one current malware policy name, and comparing said user group identifier stored in said entry of said event log and said group identifiers associated with said administrator identifier to determine whether to allow the administrator later access to said e-mail event.

2. The method as recited in claim 1, said method further comprising:

determining said parent group identifiers by reference to a lookup table.

3. The method as recited in claim 1 wherein said event is an e-mail message received by said user.

4. The method as recited in claim 3 further comprising:

saving said e-mail message in a file within said computer system.

5. A computer system that allows an administrator to access an e-mail event within an organization in which each user is affiliated with a group and in which messaging security is performed in a malware scanning environment, said system comprising:

a user of said organization who is affiliated with a first group;

a computer server at which is received said e-mail event associated with said user and which is arranged to scan an e-mail message corresponding to said e-mail event to detect malware;

an event log file including an entry into which is logged the occurrence of said e-mail event;

a first group identifier that identifies said first group and that is recorded as a field in said entry;

an administrator of said organization who has authority over a plurality of groups;

a computer over which said administrator can access said computer system;

a plurality of parent group identifiers corresponding to groups within said organization that subsume said first group to which said user belongs;

a message group set that includes said first group identifier and said parent group identifiers and that is recorded as a field in said entry; and means for facilitating later administrator access to said e-mail event by comparing the a plurality of groups said administrator has authority over with first said group recorded within said entry to determine whether to allow said administrator later access to said e-mail.

6. The system as recited in claim 5, said system further comprising:

a lookup table by which said parent group identifiers can be determined by reference to said first group identifier.

7. The system as recited in claim 5 wherein said e-mail message is saved in a file within said computer system.

8. A computer-readable medium comprising computer code for logging an e-mail event in an organization to facilitate later access by an administrator for e-mail messaging security associated with a malware scanning system, said computer code of said computer-readable medium effecting the following:

assigning to each of a plurality of users in said organization a group affiliation, each group being associated with a group identifier, such that each user has a group identifier;

assigning said administrator in said organization a plurality of groups for which said administrator manages e-mail events, wherein said administrator has an administrator identifier, said administrator identifier being associated with a plurality of group identifiers of the groups said administrator manages;

receiving said e-mail event in a computer system of said organization, said e-mail event being associated with one of said users;

determining at least one current malware policy associated with said group identifiers;

scanning an e-mail associated with said e-mail event for malware using said at least one current malware policy;

storing said e-mail event on a server computer of said computer system;

determining a user group identifier corresponding to the group to which said user belongs;

determining a plurality of parent group identifiers corresponding to groups within said organization that subsume said group to which said user belongs;

forming a message group set that includes said user group identifier and said parent group identifiers;

storing at least a portion of said e-mail event in an entry in an event log and including said message group set in said entry and at least one current malware policy name, and comparing said user group identifier stored in said entry of said event log and said group identifiers associated with said administrator identifier to determine whether to allow the administrator later access to said e-mail event.

* * * * *

UNITED STATES PATENT AND TRADEMARK OFFICE
CERTIFICATE OF CORRECTION

PATENT NO. : 7,647,398 B1  
APPLICATION NO. : 11/183665  
DATED : January 12, 2010  
INVENTOR(S) : Yi Pin Fan Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this

Sixteenth Day of November, 2010

David J. Kappos  
*Director of the United States Patent and Trademark Office*